United States Patent
Chapman et al.

(10) Patent No.: US 10,567,036 B2
(45) Date of Patent: Feb. 18, 2020

(54) ECHO CANCELLATION TO ALLEVIATE TIMING VARYING CHANNELS

(71) Applicant: Cisco Technology, Inc., San Jose, CA (US)

(72) Inventors: John T. Chapman, Coto de Caza, CA (US); Hang Jin, Plano, TX (US); Tong Liu, Acton, MA (US)

(73) Assignee: Cisco Technology, Inc., San Jose, CA (US)

( * ) Notice: Subject to any disclaimer, the term of this patent is extended or adjusted under 35 U.S.C. 154(b) by 53 days.

(21) Appl. No.: 16/012,504

(22) Filed: Jun. 19, 2018

(65) Prior Publication Data

US 2019/0386701 A1 Dec. 19, 2019

(51) Int. Cl.
*H04B 3/23* (2006.01)
*H04B 3/32* (2006.01)
*H04B 10/25* (2013.01)

(52) U.S. Cl.
CPC ............... *H04B 3/234* (2013.01); *H04B 3/32* (2013.01); *H04B 10/2504* (2013.01)

(58) Field of Classification Search
None
See application file for complete search history.

(56) References Cited

U.S. PATENT DOCUMENTS

| 5,568,202 | A * | 10/1996 | Koo | H04L 1/242 348/192 |
| 7,113,491 | B2 * | 9/2006 | Graziano | H04L 1/0001 370/286 |
| 7,133,442 | B2 * | 11/2006 | Hamdi | H04B 1/1027 375/222 |
| 8,077,641 | B2 * | 12/2011 | Basu | H04B 3/234 370/286 |
| 9,426,279 | B2 * | 8/2016 | Lu | H04M 3/002 |
| 2017/0041358 | A1 * | 2/2017 | Wang | H04L 65/403 |
| 2019/0044626 | A1 * | 2/2019 | Hewavithana | H04L 12/2801 |

* cited by examiner

*Primary Examiner* — Hong S Cho
(74) *Attorney, Agent, or Firm* — Merchant & Gould P.C.

(57) ABSTRACT

Echo cancellation to alleviate timing varying channels may be provided. First, a feedback signal corresponding to one of a plurality of downstream paths and a combination upstream signal comprising a combination of upstream signals from a plurality of upstream paths may be received. Next, a plurality of echo corrected signals may be created using the feedback signal, the combination upstream signal, and a plurality of echo cancelation coefficients that each respectively correspond to each one of the plurality of echo corrected signals and that are different from each other. Then a one of the plurality of echo cancelation coefficients that corresponds to a one of the plurality of echo corrected signals that provides a best echo cancellation performance as compared to other ones of the plurality of echo corrected signals may be selected to use.

20 Claims, 5 Drawing Sheets

ECHO CANCELLATION TO ALLEVIATE TIMING VARYING CHANNELS

TECHNICAL FIELD

The present disclosure relates generally to echo cancellation.

BACKGROUND

A Hybrid Fiber-Coaxial (HFC) network is a broadband network that combines optical fiber and coaxial cable. It has been commonly employed globally by cable television operators. In a HFC cable network, television channels are sent from a cable system's distribution facility to local communities through optical fiber trunk lines. At the local community, a box translates the signal from a light beam to electrical signal, and sends it over cable lines for distribution to subscriber residences. The optical fiber trunk lines provide adequate bandwidth to allow future expansion and new bandwidth-intensive services.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
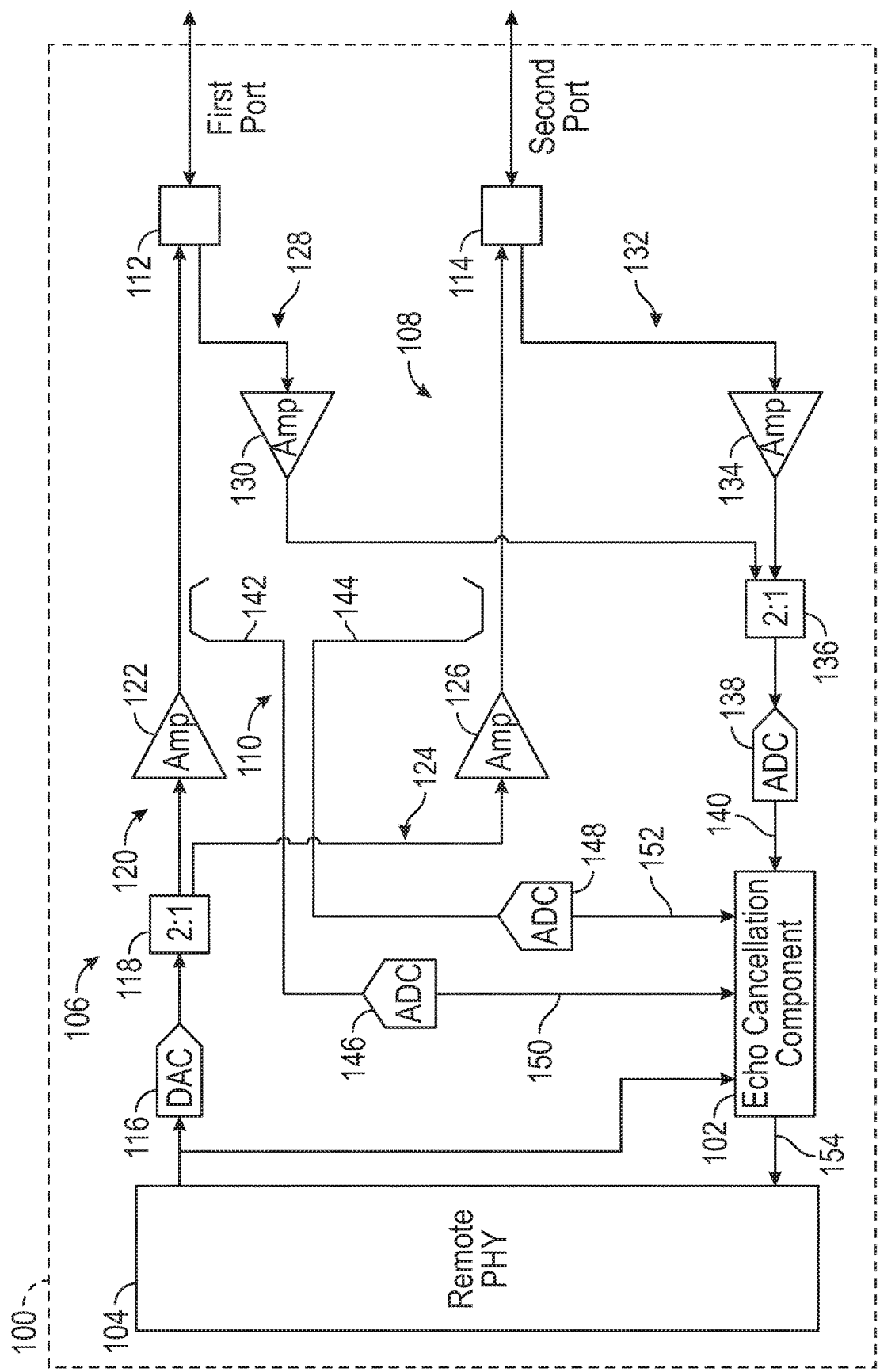
FIG. 1 is a block diagram of a system for providing echo cancellation.

Echo cancellation to alleviate timing varying channels may be provided. First, a feedback signal corresponding to one of a plurality of downstream paths and a combination upstream signal comprising a combination of upstream signals from a plurality of upstream paths may be received. Next, a plurality of echo corrected signals may be created using the feedback signal, the combination upstream signal, and a plurality of echo cancelation coefficients that each respectively correspond to each one of the plurality of echo corrected signals and that are different from each other. Then a one of the plurality of echo cancelation coefficients that corresponds to a one of the plurality of echo corrected signals that provides a best echo cancelation performance as compared to other ones of the plurality of echo corrected signals may be selected to use.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Multiple-system operators (MSOs) are operators of multiple cable or direct-broadcast satellite television systems. These systems may include HFC networks. To amplify upstream (US) signals and downstream (DS) signals in the HFC network, MSOs may use nodes deployed within the HFC. In the HFC network, a node may comprise a container that may house optical and electrical circuitry. An optical fiber cable or a coaxial cable may be connected to an input side of the node and a plurality of coaxial cables may be connected to a output side of the node. The input side of the node may be connect to a headend in the HFC network and the output side of the node may be connected to Customer Premises Equipment (CPE) of subscribers to the HFC. Amplifiers may be used in the node to amplify upstream (US) signals and downstream (DS) signals. Embodiments of the disclosure may provide a digital echo cancellation (EC) process that may alleviate adverse effects of timing varying channels on echo cancellation performance for a node with multiple ports for supporting full duplex (FDX) Data Over Cable Service Interface Specification (DOCSIS) operation.

Echoes may occur in FDX DOCSIS operation of a node. Accordingly, echo cancellation (EC) may be implemented for supporting FDX DOCSIS operations. These echoes may result from channel discontinuities. Examples of channel discontinuities may include, but are not limited to, tap input/output, node input/output, coaxial transmission medium inhomogeneous/imperfection, and any circuitry/devices inserted in the coaxial network. Embodiments of the disclosure may determine the magnitudes and phases of these echoes, and generate correcting signals that may have the same magnitudes as the echoes, but with a 180 degree phase offset. The echoes may be cancelled out by adding the correcting signals into a receiver input data path. The magnitudes and phases of the echoes are denoted hereafter as echo cancellation coefficients.

Because the magnitudes and phase of the echoes (i.e., echo cancellation coefficients) may change over time (i.e., a time varying channel), the echo cancellation coefficients may be updated to reflect these changes. The process by which the echo cancellation coefficients may be determined and updated may comprise echo cancellation training, and the time period over which the echo cancellation may be trained may comprise an echo cancellation training window. In some cases where the changes may be so rapid that echo cancellation coefficients may not be updated quickly enough, the echo cancellation performance may deteriorate. Examples of time varying channels may comprise, but are not limited to, swinging cables during winding days, sudden temp changes (e.g., within a few seconds of rains falling on cables), and sudden changes of mechanic stress on coaxial connectors in cable pedestal due to heavy machines operating nearby. Consequently, embodiments of the disclosure may provide a process that may alleviate the adverse effect of a time varying channel on echo cancellation performance.

FIG. 1 is a block diagram of a system 100 for providing echo cancellation to alleviate timing varying channels consistent with embodiments of the disclosure. As shown in FIG. 1, system 100 may comprise an echo cancelation component 102, a remote PHY 104, a plurality of downstream paths 106, a plurality of upstream paths 108, a feedback pathway 110, a first coupler 112 (e.g., at a first port), and a second coupler 114 (e.g., at a second port). While FIG. 1 shows two ports, system 100 may comprise any number of ports and is not limited to two ports.

System 100 may comprise a node in an HFC network. The node may comprise a container that may house optical and electrical circuitry. An optical fiber cable may be connected to one side of the node and a plurality of coaxial cables may be connected to the other side of the node. The optical fiber cable may be connected to a cable modem termination system (CMTS) in a headend in the HFC network and the plurality of coaxial cables may be connected to CPE of subscribers to the HFC. As such, the node may facilitate communications between the headend and the CPE. Consistent with embodiments of the disclosure, system 100 may comprise an FDX amplifier supporting FDX Data Over Cable Service Interface Specification (DOCSIS) operation.

The CMTS may comprise a device located in a service provider's (e.g., a cable company's) headend that may be used to provide high speed data services, such as cable Internet or Voice-Over-Internet Protocol, to subscribers. Remote physical layer (i.e., RPHY) may comprise shifting or distributing the physical layer (i.e., PHY) of a conventional cable headend CMTS to fiber nodes (e.g., RPHY nodes) in a network. Remote. Remote PHY 104 may comprise circuitry to implement the physical layer of the CMTS.

Echo cancelation component 102 may be practiced in an electrical circuit comprising discrete electronic elements, packaged or integrated electronic chips containing logic gates, a circuit utilizing a microprocessor, or on a single chip containing electronic elements or microprocessors. Furthermore, echo cancelation component 102 may also be practiced using other technologies capable of performing logical operations such as, for example, AND, OR, and NOT, including but not limited to, mechanical, optical, fluidic, and quantum technologies. As described in greater detail below with respect to FIG. 5, echo cancelation component 102 may be practiced in a computing device 500.

Regarding plurality of downstream paths 106, remote PHY 104 may send a digital downstream signal to a downstream digital-to-analog converter 116 that my convert the received digital downstream signal and convert it to an analog downstream signal. Digital-to-analog converter 116 may provide the analog downstream signal to a downstream splitter 118 that may split the analog downstream signal and place it into a first downstream path 120 that may feed a first downstream amplifier 122 and a second downstream path 124 that may feed a second downstream amplifier 126. Plurality of downstream paths 106 may comprise first downstream path 120 and second downstream path 124. First downstream amplifier 122 may provide the signal on first downstream path 120 to first coupler 112. Similarly, second downstream amplifier 126 may provide the signal on second downstream path 124 to second coupler 114. First coupler 112 may provide the signal from first downstream path 120 to first customer premises equipment and second coupler 114 may provide the signal from second downstream path 124 to second customer premises equipment. First customer premises equipment and second customer premises equipment may comprise, but are not limited to, a cable modem, a cellular base station, a tablet device, a mobile device, a smart phone, a telephone, a remote control device, a set-top box, a digital video recorder, a personal computer, a network computer, a mainframe, a router, or other similar microcomputer-based device.

Plurality of upstream paths 108 may comprise a first upstream path 128 that may feed a first upstream amplifier 130 and a second upstream path 132 that may feed a second upstream amplifier 134. An upstream combiner 136 may combine a first upstream signal amplified by first upstream amplifier 130 and a second upstream signal amplified by second upstream amplifier 134 and feed it to an upstream analog-to-digital converter 138. The output of analog-to-digital converter 138 may comprise a combination upstream signal 140 that may be fed to echo cancelation component 102. First coupler 112 may receive the first upstream signal from first customer premises equipment and second coupler 114 may receive the second upstream signal from second customer premises equipment.

Feedback pathway 110 may comprise a first feedback pathway 142 and a second feedback pathway 144. First feedback pathway 142 may sample the output of first downstream amplifier 122 and second feedback pathway 144 may sample the output of second downstream amplifier 126. System 100 may further comprise a first feedback analog-to-digital converter 146 and a second feedback analog-to-digital converter 148. First feedback analog-to-digital converter 146 may receive the sampled signal from first downstream path 120 and feed a digital version to echo cancelation component 102 as a first feedback signal 150. Similarly, second feedback analog-to-digital converter 148 may receive the sampled signal from second downstream path 124 and feed a digital version to echo cancelation component 102 as a second feedback signal 152. As such, first feedback signal 150 may correspond to first downstream path 120 of plurality of downstream paths 106 and second feedback signal 152 may correspond to second downstream path 124 of plurality of downstream paths 106.

Echoes within system 100 may be present in combination upstream signal 140. For example, these echoes may be present due to a reflection in first coupler 112 of the signal in first downstream path 120 and a reflection in second coupler 114 of the signal in second downstream path 124. The echo from first coupler 112 may be reflected back into first upstream path 128 and the echo from second coupler 114 may be reflected back into second upstream path 132. The echoes may contain both the downstream signal and noise generated first downstream amplifier 122 and second downstream amplifier 126. Embodiments of the disclosure may provide, in an echo cancelation component output 154, echo cancellation to alleviate timing varying channels.

Figure 2:
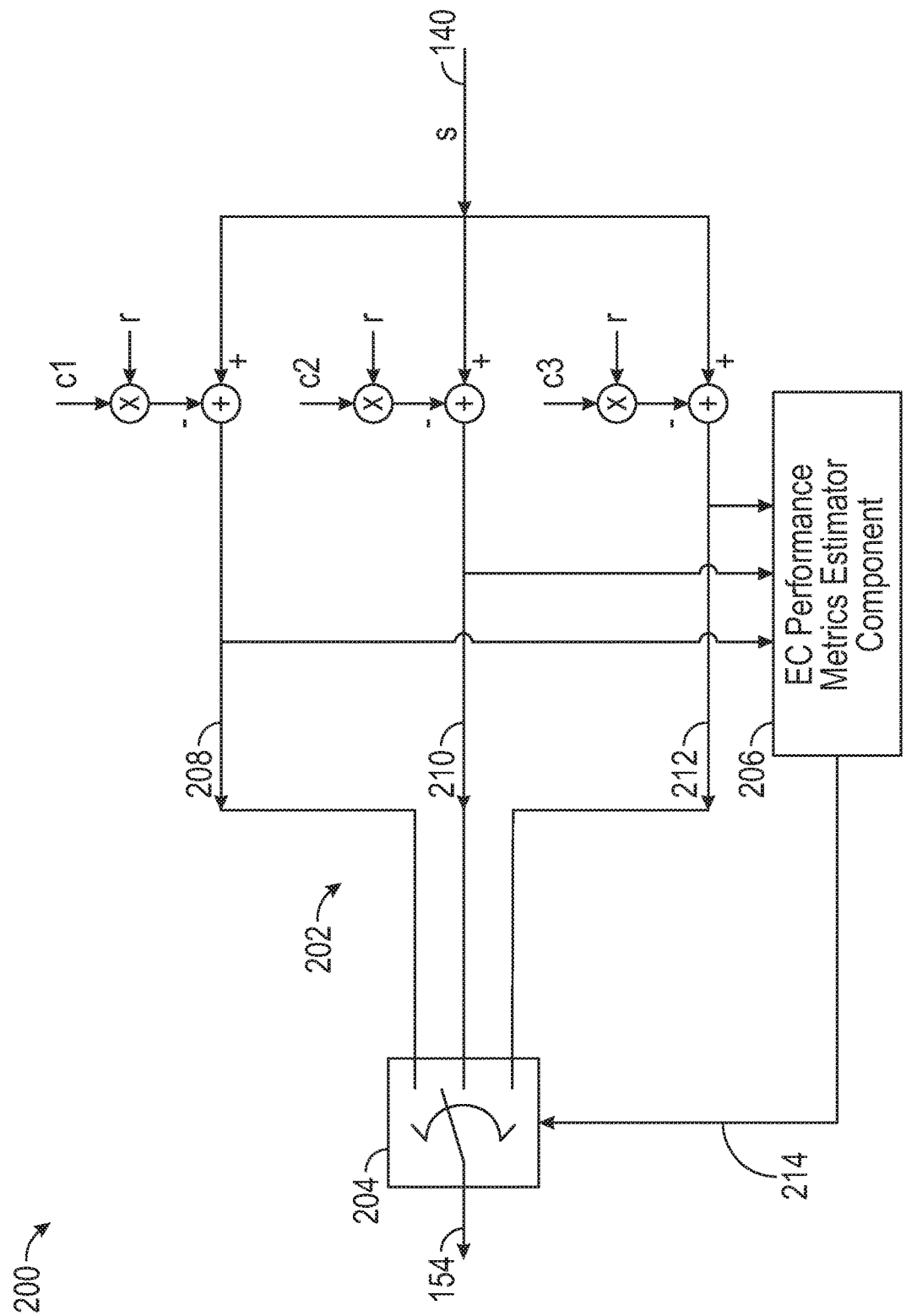
FIG. 2 is a block diagram of a multi-branch receiver.

FIG. 2 is a block diagram of a multi-branch receiver 200 that may be used in conjunction with and that may be disposed within echo cancelation component 102. As shown in FIG. 2, multi-branch receiver 200 may comprise a plurality of branches 202, a switch 204, and an echo cancelation performance metrics estimator component 206. Plurality of branches 202 may comprise a first branch 208, a second branch 210, and a third branch 212. While FIG. 2 shows plurality of branches 202 comprising three branches, plurality of branches 202 may comprise any number of branches and is not limited to three.

Echo cancelation performance metrics estimator component 206 may be practiced in an electrical circuit comprising discrete electronic elements, packaged or integrated electronic chips containing logic gates, a circuit utilizing a microprocessor, or on a single chip containing electronic elements or microprocessors. Furthermore, echo cancelation performance metrics estimator component 206 may also be practiced using other technologies capable of performing logical operations such as, for example, AND, OR, and NOT, including but not limited to, mechanical, optical, fluidic, and quantum technologies. As described in greater detail below with respect to FIG. 5, echo cancelation performance metrics estimator component 206 may be practiced in a computing device 500.

As shown in FIG. 2, each of plurality of branches 202 may create an echo corrected signal using a feedback signal (i.e., r), combination upstream signal 140 (i.e., s), and an echo cancelation coefficient (i.e., c1 for first branch 208, c2 for second branch 210, and c3 for third branch 212). Each of the echo cancelation coefficients may be different from each other. The feedback signal (i.e., r) may comprise first feedback signal 150 or second feedback signal 152. Each one of plurality of branches 202 branch may involve one complex multiplication and one addition for each Orthogonal Frequency Division Multiplexing (OFDM) subcarrier. Even with three branches, the extra processing may not be substantial compared to the overall echo cancelation process (i.e., channelization and FFT).

Echo cancelation performance metrics estimator component 206 may sample each of the echo corrected signals from each of plurality of branches 202 and select to use one of the plurality of echo cancelation coefficients (i.e., c1 for first branch 208, c2 for second branch 210, and c3 for third branch 212) that corresponds to the echo corrected signal that provides the best echo cancelation performance as compared to other ones of the plurality of echo corrected signals. The performance metrics may involve one real addition. Then echo cancelation performance metrics estimator component 206 may send a signal 214 to switch 204 to select the one of the plurality of branches 202 that corresponds to the selected echo cancelation coefficient.

Multi-branch receiver 200 may be implemented with frequency domain echo cancelation. Frequency domain echo cancelation may perform echo cancellation in the frequency domain on each Orthogonal Frequency Division Multiple Access (OFDMA) subcarrier. Frequency echo cancelation may be possible because FDX band may supports OFDM/OFDMA (e.g., no QAM). In this example, the coefficients (i.e., c1, c2 and c3) may be a complex scalar per subcarrier, and the echo cancelation performance metrics may be a signal power (e.g., best echo cancelation yields lowest residue power).

Figure 3:
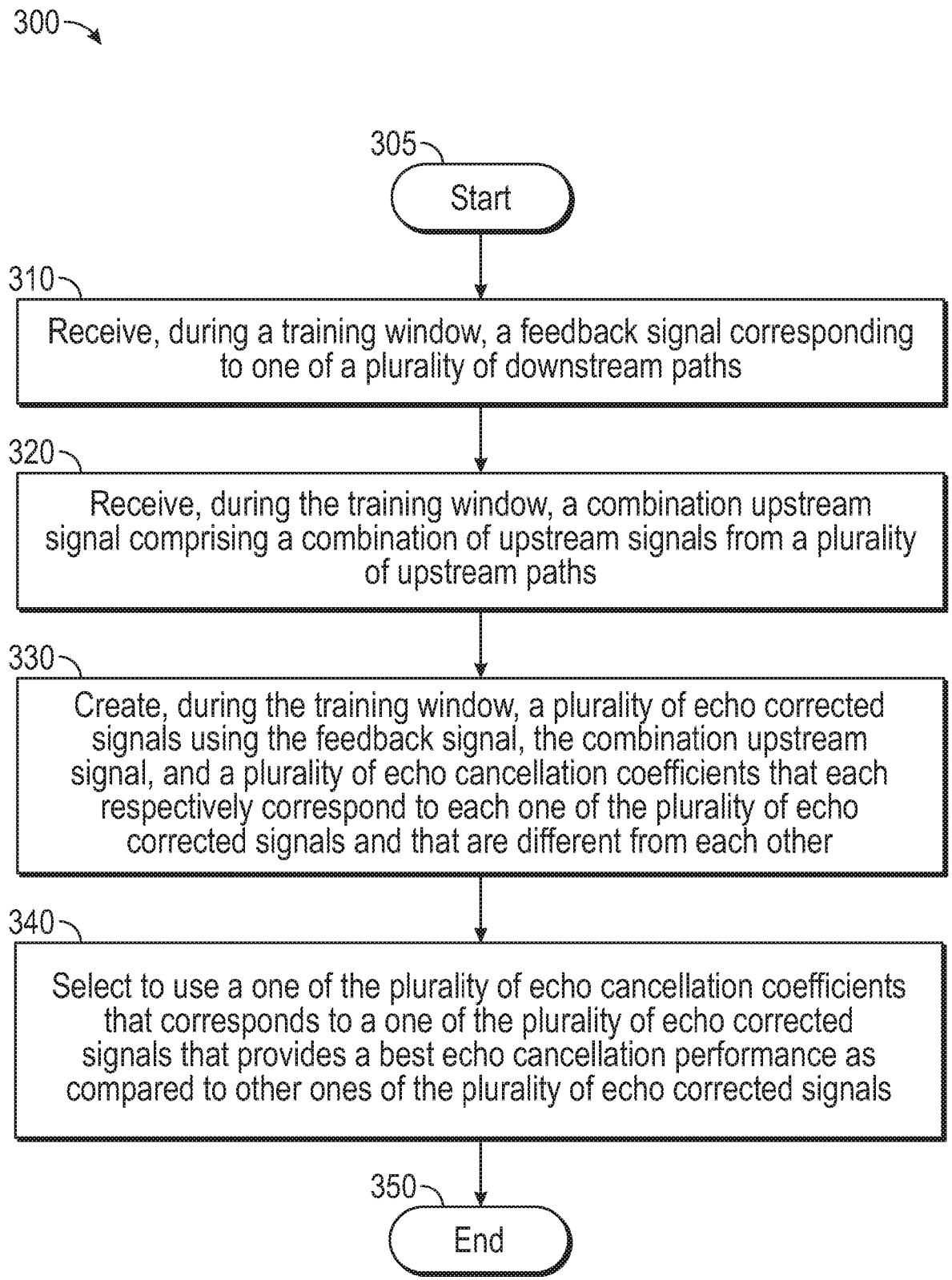
FIG. 3 is a flow chart of a method for providing echo cancellation to alleviate timing varying channels.

FIG. 3 is a flow chart setting forth the general stages involved in a method 300 consistent with an embodiment of the disclosure for providing echo cancellation to alleviate timing varying channels. Method 300 may be implemented using echo cancelation component 102 and multi-branch receiver 200 as described in more detail above with respect to FIG. 1 and FIG. 2. Ways to implement the stages of method 300 will be described in greater detail below.

Method 300 may begin at starting block 305 and proceed to stage 310 where echo cancelation component 102 may receive, during a training window, a feedback signal corresponding to one of plurality of downstream paths 106. The feedback signal, for example, may comprise first feedback signal 150 or second feedback signal 152. For example, upstream profile management can factor in the echo cancelation performance. Embodiments of the disclosure may observe the post-echo cancelation Modulation Error Ratio (MER) at echo cancelation component output 154. The statistics of the MER may be determined over a period of time. The duration of the period over which the MER statistics are determined may be close to/larger than the channel variation period. A MER threshold may be set based on the MER statistics, and select the upstream profile accordingly. The MER threshold, for example, may be m-1s or m-2s, where m is the mean of the MER and s is the standard deviation of the MER.

The CMTS may proactively provision one of two active upstream profiles supported by a cable modem (CM) to be interference-robust. Once the MER degrades beyond the predetermined threshold, the CMTS upstream scheduler may switch to grant using the interference-robust profile. The response time may be bound by the MER degradation detection time and MAP advance time. For consistent, repetitive, and slow time varying channel changes, for example, swing cable in winding days, the CMTS may update the Upstream Channel Descriptor (UCD) settings of specific sets of data profiles, based on the post-echo cancelation MER history data, to prepare potential transmitting CMs on a given upstream channel.

When echo cancelation performance deterioration is detected as described above, the node (e.g., system 100) may send a message to the CMTS scheduler requesting the echo cancelation training window (i.e., the tanning window). This request/grant scheme may incur a latency and the training window may not be scheduled quickly enough to alleviate the timing varying channel.

The scheduler may schedule frequent training windows to anticipate the timing varying channel. For example, once every 50 ms. However, the issue with this approach may be that the training window lasts typically a few upstream frames, and a once every 50 ms training window may incur too much overhead.

Consequently, embodiments of the disclosure may provide a prompt training window scheduling that incurs a little overhead (e.g., a less frequent training windows) in the case where the channel is static, but may increase the training frequency once a time varying channel is detected. This may be accomplished through dynamic MAP dropping as follows. The CMTS scheduler may arrange periodic filler maps. The filler maps may contain grants for nonessential things, for examples, IM zones, or grants to best effort flows. When the MER drops and exceeds the aforementioned threshold, the node may replace subsequent filler maps with idle frames (i.e., drop the filler maps) as training opportunities until explicit training opportunities arrives. The training window may comprise a silence period specified in the full duplex (FDX) Data Over Cable Service Interface Specification (DOCSIS). There may be no upstream signals (i.e., transmissions) from customer premises equipment (e.g., cable modems) during the training window.

From stage 310, where echo cancelation component 102 receives, during the training window, the feedback signal corresponding to one of plurality of downstream paths 106, method 300 may advance to stage 320 where echo cancelation component 102 may receive, during the training window, combination upstream signal 140 comprising a combination of upstream signals from plurality of upstream paths 108. For example, upstream combiner 136 may combine a first upstream signal amplified by first upstream amplifier 130 and a second upstream signal amplified by second upstream amplifier 134 and feed it to upstream analog-to-digital converter 138. The output of analog-to-digital converter 138 may comprise a combination upstream signal 140 that may be fed to echo cancelation component 102. Because there may be no upstream signals (i.e., transmissions) from customer premises equipment (e.g., cable modems) during the training window, the upstream signals from plurality of upstream paths 108 during the training window may comprise echoes coupled from plurality of downstream paths 106 to plurality of upstream paths 108 due to full duplex operation for example.

Once echo cancelation component 102 receives, during the training window, combination upstream signal 140 comprising the combination of upstream signals from plurality of upstream paths 108 in stage 320, method 300 may continue to stage 330 where echo cancelation component 102 may create, during the training window, a plurality of echo corrected signals using the feedback signal, combination upstream signal 140, and the plurality of echo cancelation coefficients that each respectively correspond to each one of the plurality of echo corrected signals and that are different from each other. For example, multi-branch receiver 200 may improve echo cancelation performance through a test-then-select process. In this process, a received signal may go through multiple branches with each branch providing echo cancelation using different echo cancelation coefficients. As described in greater detail below, the different echo cancelation coefficients may be selected based on historical echo cancelation coefficient data and channel characteristics. The general principles for selecting echo cancelation coefficients may be that the echo cancelation coefficients selected may be the best candidates given the time varying channel.

With multi-branch receiver 200 of FIG. 2, each of plurality of branches 202 may create an echo corrected signal using the feedback signal (i.e., r), combination upstream signal 140 (i.e., s), and an echo cancelation coefficient (i.e., c1 for first branch 208, c2 for second branch 210, and c3 for third branch 212). Each of the echo cancelation coefficients may be different from each other. The feedback signal (i.e., r) may comprise first feedback signal 150 or second feedback signal 152.

After echo cancelation component 102 creates, during the training window, the plurality of echo corrected signals in stage 330, method 300 may proceed to stage 340 where echo cancelation component 102 may select to use a one of the plurality of echo cancelation coefficients that corresponds to a one of the plurality of echo corrected signals that provides a best echo cancelation performance as compared to other ones of the plurality of echo corrected signals. For example, the echo cancelation performance may be determined for each branch, and the branch with the best echo cancelation performance may be selected to output its signal. The index or metric used to determine performance may comprise MER. The performance, for example, may be assesses on a symbol-by-symbol or frame-by-frame basis. With frequency domain echo cancelation, the echo cancelation may be done on each subcarrier, and the echo cancelation performance metrics may be the power of the post echo cancelation residue signal computed with a moving average.

Echo cancelation performance metrics estimator component 206 of FIG. 2 may sample each of the echo corrected signals from each of plurality of branches 202 and select to use a one of the plurality of echo cancelation coefficients (i.e., c1 for first branch 208, c2 for second branch 210, and c3 for third branch 212) that corresponds to the echo corrected signal that provides the best echo cancelation performance as compared to other ones of the plurality of echo corrected signals. Then echo cancelation performance metrics estimator component 206 may send a signal 214 to switch 204 to select the one of the plurality of branches 202 that corresponds to the selected echo cancelation coefficient. For example, if second branch 210 has the best performance, echo cancelation performance metrics estimator component 206 may signal to switch 204 to connect second branch 210 to echo cancelation component output 154. In this example, once the training period is over, echo cancelation may be performed by echo cancelation component 102 using c2 as the echo cancelation coefficient. Echo cancelation component 102 may continue using c2 as the echo cancelation coefficient in this example until the next training period during which another one of the plurality of echo cancelation coefficients may be selected by repeating the process as described above. Once echo cancelation component 102 selects to use one of the plurality of echo cancelation coefficients in stage 340, method 300 may then end at stage 350.

Embodiments of the disclosure may use echo cancelation coefficient smoothing/averaging. Echo cancelation coefficient smoothing/averaging may comprise the echo cancelation coefficient being used in echo cancellation block may not be the echo cancelation coefficient computed from the reference signal (i.e., r) and received signal (i.e., s) at the current time instance. Rather, the echo cancelation coefficient used may be an average of echo cancelation coefficient determined in the past over a period of time. The process may be based on the assumption that the channel changes very rapidly, and the echo cancelation training window interval may not be short enough (e.g., due to overhead concern or high echo cancelation signaling latency) to catch up with the varying channel, the echo cancelation coefficient becomes out-of-date right after it is determined. In this case, the echo cancelation may work a bit more reliably by using an averaged echo cancelation coefficient rather than using an instant echo cancelation coefficient. An averaged echo cancelation coefficient may capture the main static echo cancelation characteristics, and may leave out the timing varying components that may not be captured. Smoothing/Averaging echo cancelation coefficients may yield sub-optimal echo cancelation performance, but it may avoid potential catastrophic echo cancelation performance deterioration.

The echo cancelation coefficients used in branches may be selected in such a way that they may be the best guesses of the "real" echo cancelation coefficient. If the channel is static, once it is computed during the echo cancelation training window, the echo cancelation coefficient may stay accurate until the next echo cancelation training window when it may be updated again. When the channel is time varying, the echo cancelation coefficient may diverge from the real channel characteristics with time. Unless the training window interval is shorter than the channel coherent time, the echo cancelation performance may deteriorate with the time varying channel. It may not always be possible to make the training window interval less than the channel coherent time. For example, channel changes due to connector stress changes caused by a heavy machine operating nearby may have ~10 ms coherent time. Scheduling training window interval less than 10 ms may incur too much overhead.

Figure 4:
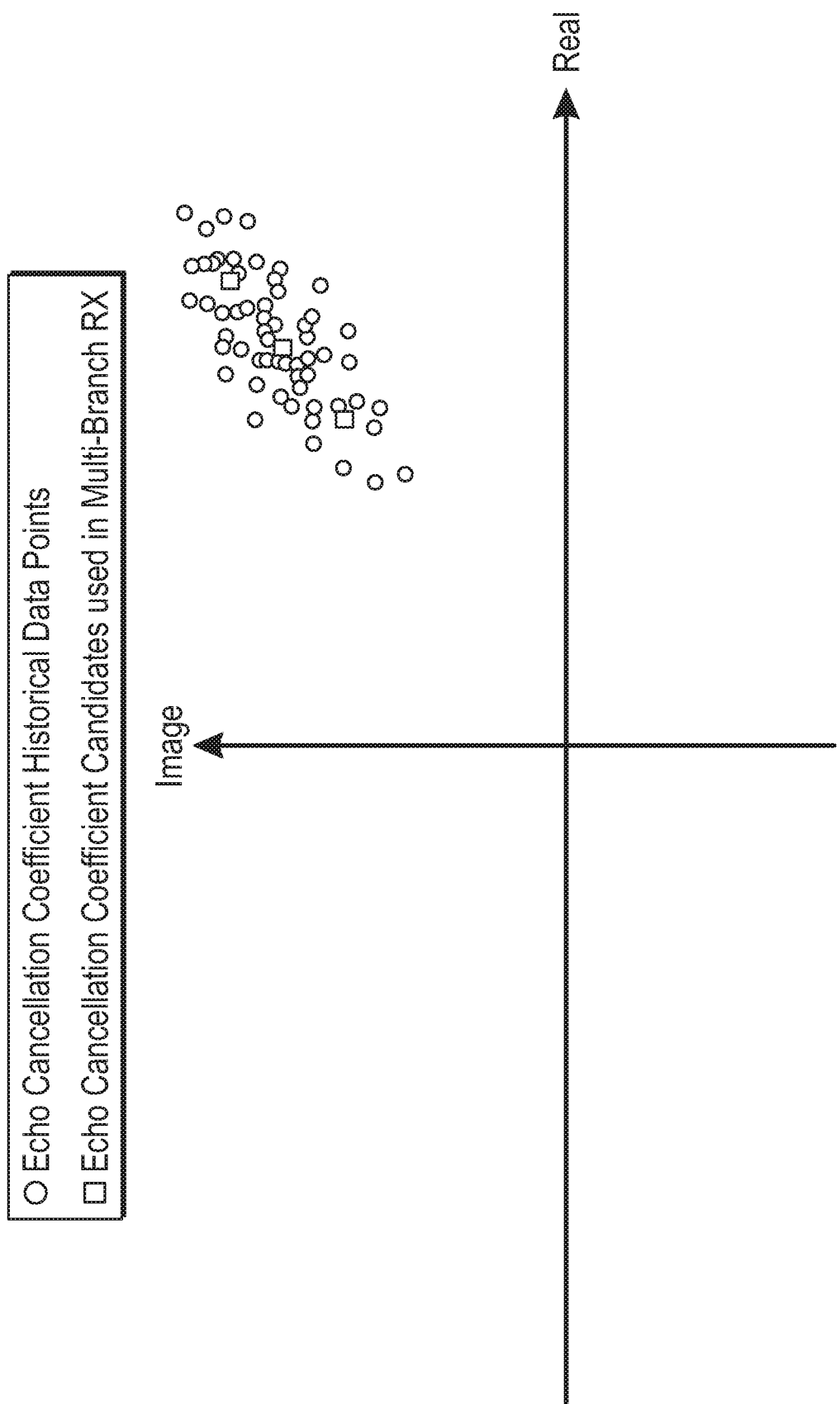
FIG. 4 is diagram illustrating echo cancelation coefficient selection.

FIG. 4 is diagram illustrating echo cancelation coefficient selection. As shown in FIG. 4, in the case where the training window interval is longer than the channel coherent time, embodiments of the disclosure may consider the historical echo cancelation coefficients (e.g., the echo cancelation coefficients historical data points of FIG. 4) and select a few candidate echo cancelation coefficients (e.g., the echo cancelation coefficients candidates used in multi-branch RX of FIG. 4) that yield the best coverage of the possible echo cancelation coefficients. The plurality of echo cancelation coefficients (e.g., c1, c2, and c3) may comprise the echo cancelation coefficients candidates used in multi-branch RX shown in FIG. 4.

With frequency domain echo cancelation (e.g., for OFDMA/OFDM signals), each echo cancelation coefficient may comprise a point in a two-dimensional space. So, the echo cancelation coefficient candidates used in multi-branch RX of FIG. 4 may be points that best represent the echo cancelation coefficients cluster in a two-dimensional space cluster of echo cancelation coefficients historical data points of FIG. 4. The coefficients for each subcarrier may be treated independently.

The echo cancelation coefficient historical data may comprise a collection of the echo cancelation coefficients computed in the past during a period of time. The duration of the period may be much longer than the coherent time of the channel characteristics that multi-branch receiver 200 is intended to service. For example, if the channel coherent time is 10 ms, the echo cancelation coefficient historical data may comprise data collected within 10 s or so. Also, the number of data points should be large enough to make statistical sense, for example, greater than 100.

Figure 5:
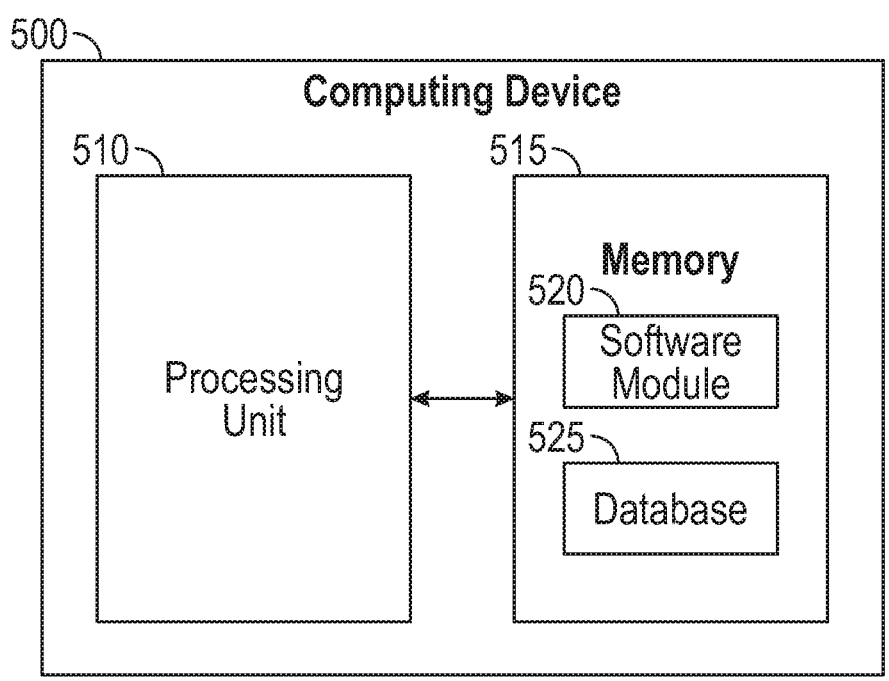
FIG. 5 is a block diagram of a computing device.

FIG. 5 shows computing device 500. As shown in FIG. 5, computing device 500 may include a processing unit 510 and a memory unit 515. Memory unit 515 may include a software module 520 and a database 525. While executing on processing unit 510, software module 520 may perform, for example, processes for providing echo cancellation to alleviate timing varying channels, including for example, any one or more of the stages from method 300 described above with respect to FIG. 3. Computing device 500, for example, may provide an operating environment for echo cancelation component 102 and echo cancelation performance metrics estimator component 206. Echo cancelation component 102 and echo cancelation performance metrics estimator component 206 may operate in other environments and are not limited to computing device 500.

Computing device 500 may be implemented using a Wireless Fidelity (Wi-Fi) access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay devices, or other similar microcomputer-based device. Computing device 500 may comprise any computer operating environment, such as hand-held devices, multiprocessor systems, microprocessor-based or programmable sender electronic devices, minicomputers, mainframe computers, and the like. Computing device 500 may also be practiced in distributed computing environments where tasks are performed by remote processing devices. The aforementioned systems and devices are examples and computing device 500 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the components illustrated in FIG. 1 and FIG. 2 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 500 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
receiving, by an echo cancelation component during a training window, a feedback signal corresponding to one of a plurality of downstream paths;
receiving, by the echo cancelation component during the training window, a combination upstream signal comprising a combination of upstream signals from a plurality of upstream paths;
creating, by the echo cancelation component during the training window, a plurality of echo corrected signals using the feedback signal, the combination upstream signal, and a plurality of echo cancelation coefficients that each respectively correspond to each one of the plurality of echo corrected signals and that are different from each other; and
selecting to use a one of the plurality of echo cancelation coefficients that corresponds to a one of the plurality of echo corrected signals that provides a best echo cancelation performance as compared to other ones of the plurality of echo corrected signals.

2. The method of claim 1, further comprising:
determining that echo cancelation performance of an output signal of the echo cancelation component has deteriorated below a predetermined threshold; and
requesting the training window in response to determining that the echo cancelation performance of the output signal of the echo cancelation component has deteriorated to the predetermined threshold.

3. The method of claim 2, wherein determining that the echo cancelation performance of the output signal of the echo cancelation component has deteriorated below the predetermined threshold comprises determining that a Modulation Error Ratio (MER) of the output signal of the echo cancelation component has dropped below the predetermined threshold.

4. The method of claim 1, further comprising scheduling the training window periodically.

5. The method of claim 1, wherein the training window comprises a silence period specified in a full duplex (FDX) Data Over Cable Service Interface Specification (DOCSIS).

6. The method of claim 1, wherein creating the plurality of echo corrected signals comprises providing the combination upstream signal to a plurality of branches wherein each of the plurality of branches respectively uses a different corresponding one of the plurality of echo cancelation coefficients.

7. The method of claim 1, further comprising selecting the plurality of echo cancelation coefficients based on historical echo cancelation coefficient data and channel characteristics.

8. The method of claim 1, wherein selecting to use the one of the plurality of echo cancelation coefficients that corresponds to the one of the plurality of echo corrected signals that provides the best echo cancelation performance comprises selecting to use the one of the plurality of echo cancelation coefficients that corresponds to the one of the plurality of echo corrected signals that provides the best echo cancelation performance wherein the best echo cancelation performance comprise a Modulation Error Ratio (MER).

9. The method of claim 1, wherein receiving, by the echo cancelation component, the feedback signal comprises receiving the feedback signal wherein the echo cancelation component is disposed in a node disposed in a Hybrid Fiber-Coaxial (HFC) network.

10. A non-transitory computer-readable medium that stores a set of instructions which when executed perform a method comprising:
receiving, by an echo cancelation component during a training window, a feedback signal corresponding to one of a plurality of downstream paths;
receiving, by the echo cancelation component during the training window, a combination upstream signal comprising a combination of upstream signals from a plurality of upstream paths;
creating, by the echo cancelation component during the training window, a plurality of echo corrected signals using the feedback signal, the combination upstream signal, and a plurality of echo cancelation coefficients that each respectively correspond to each one of the plurality of echo corrected signals and that are different from each other; and
selecting to use a one of the plurality of echo cancelation coefficients that corresponds to a one of the plurality of echo corrected signals that provides a best echo cancelation performance as compared to other ones of the plurality of echo corrected signals.

11. The computer-readable medium of claim 10, further comprising:
determining that echo cancelation performance of an output signal of the echo cancelation component has deteriorated below a predetermined threshold; and
requesting the training window in response to determining that the echo cancelation performance of the output signal of the echo cancelation component has deteriorated to the predetermined threshold.

12. The computer-readable medium of claim 11, wherein determining that the echo cancelation performance of the output signal of the echo cancelation component has deteriorated below the predetermined threshold comprises determining that a Modulation Error Ratio (MER) of the output signal of the echo cancelation component has dropped below the predetermined threshold.

13. The computer-readable medium of claim 10, wherein creating the plurality of echo corrected signals comprises providing the combination upstream signal to a plurality of branches wherein each of the plurality of branches respectively uses a different corresponding one of the plurality of echo cancelation coefficients.

14. The computer-readable medium of claim 10, further comprising selecting the plurality of echo cancelation coefficients based on historical echo cancelation coefficient data and channel characteristics.

15. The computer-readable medium of claim 10, wherein selecting to use the one of the plurality of echo cancelation coefficients that corresponds to the one of the plurality of echo corrected signals that provides the best echo cancelation performance comprises selecting to use the one of the plurality of echo cancelation coefficients that corresponds to the one of the plurality of echo corrected signals that provides the best echo cancelation performance wherein the best echo cancelation performance comprise a Modulation Error Ratio (MER).

16. A system comprising:
a memory storage; and
a processing unit coupled to the memory storage, wherein the processing unit is operative to:
receive, during a training window, a feedback signal corresponding to one of a plurality of downstream paths;
receive, during the training window, a combination upstream signal comprising a combination of upstream signals from a plurality of upstream paths;
create, during the training window, a plurality of echo corrected signals using the feedback signal, the combination upstream signal, and a plurality of echo cancelation coefficients that each respectively correspond to each one of the plurality of echo corrected signals and that are different from each other; and
select to use a one of the plurality of echo cancelation coefficients that corresponds to a one of the plurality of echo corrected signals that provides a best echo cancelation performance as compared to other ones of the plurality of echo corrected signals.

17. The system of claim 16, wherein the processing unit is further operative to:
determine that echo cancelation performance of an output signal of an echo cancelation component has deteriorated below a predetermined threshold, the processing unit being disposed in the echo cancelation component; and
request the training window in response to determining that the echo cancelation performance of the output signal of the echo cancelation component has deteriorated to the predetermined threshold.

18. The system of claim 17, wherein the processing unit being operative to determine that the echo cancelation performance of the output signal of the echo cancelation component has deteriorated below the predetermined threshold comprises the processing unit being operative to determine that a Modulation Error Ratio (MER) of the output signal of the echo cancelation component has dropped below the predetermined threshold.

19. The system of claim 16, wherein the processing unit being operative to create the plurality of echo corrected signals comprises the processing unit being operative to provide the combination upstream signal to a plurality of branches wherein each of the plurality of branches respectively uses a different corresponding one of the plurality of echo cancelation coefficients.

20. The system of claim 16, wherein the processing unit being operative to select to use the one of the plurality of echo cancelation coefficients that corresponds to the one of the plurality of echo corrected signals that provides the best echo cancelation performance comprises the processing unit being operative to select to use the one of the plurality of echo cancelation coefficients that corresponds to the one of the plurality of echo corrected signals that provides the best echo cancelation performance wherein the best echo cancelation performance comprise a Modulation Error Ratio (MER).

* * * * *